(12) United States Patent
Wikel

(10) Patent No.: US 9,188,457 B2
(45) Date of Patent: Nov. 17, 2015

(54) ERGONOMIC USER INTERFACE FOR A PORTABLE NAVIGATION DEVICE

(75) Inventor: Harold L. Wikel, Muskego, WI (US)

(73) Assignee: Google Technology Holdings LLC, Mountain View, CA (US)

(*) Notice: Subject to any disclaimer, the term of this patent is extended or adjusted under 35 U.S.C. 154(b) by 1201 days.

(21) Appl. No.: 12/430,492

(22) Filed: Apr. 27, 2009

(65) Prior Publication Data

US 2010/0274483 A1    Oct. 28, 2010

(51) Int. Cl.
*G01C 21/36*    (2006.01)

(52) U.S. Cl.
CPC ........ *G01C 21/3664* (2013.01); *G01C 21/3667* (2013.01)

(58) Field of Classification Search
CPC . G01C 21/3664; Y10S 345/905; H04M 1/236
USPC .......................................................... 701/200
See application file for complete search history.

(56) References Cited

U.S. PATENT DOCUMENTS

| 2004/0061662 | A1  | 4/2004  | Yoshihara et al. |
| 2007/0050183 | A1* | 3/2007  | Kao et al. ........................ 704/3 |
| 2008/0058033 | A1* | 3/2008  | Angelhag .................. 455/575.1 |
| 2008/0218950 | A1* | 9/2008  | Morrison ...................... 361/680 |
| 2008/0243373 | A1* | 10/2008 | Cat et al. ....................... 701/207 |

FOREIGN PATENT DOCUMENTS

| DE | 10019651 B4 | 7/2004 | |
| EP | 1515524 A1 * | 3/2005 | ............. H04M 1/02 |
| WO | 2007024257 A1 | 3/2007 | |
| WO | WO 2008/079889 A1 * | 3/2008 | ............. G01C 21/34 |
| WO | WO 2008/079889 A2 * | 3/2008 | ............. G01C 21/34 |

OTHER PUBLICATIONS

Rocca, Simone: The International Search Report and The Written Opinion of the International Searching Authority, European Patent Office, Rijswijk, completed: Jul. 7, 2010, mailed: Jul. 23, 2010, all pages.

* cited by examiner

*Primary Examiner* — Joy Chng
(74) *Attorney, Agent, or Firm* — Shumaker & Sieffert, P.A.

(57) ABSTRACT

A portable navigation device (200) with an ergonomic user interface is described. It includes: a housing (210); a controller (220) coupled to the housing (210), the controller (220) configured to control the operations of a portable navigation device; memory (270), coupled to the controller (220), being operable to store a route; an integrated global positioning system (GPS) receiver (250) in the housing (210), coupled to the controller (220); a display (240) within the housing (210) and coupled to the controller (220), the display (240) viewable from a front (305) of the housing (210); and a paddle control module (310) coupled to a rear portion (315) of the housing (210), configured to control certain operations of the device. The ergonomic design allows a user ease of access, to operate a portable navigation device accurately, intuitively and with minimal distraction, during operation. This structure provides an enhanced user experience.

13 Claims, 7 Drawing Sheets

ERGONOMIC USER INTERFACE FOR A PORTABLE NAVIGATION DEVICE

BACKGROUND

1. Field

The present disclosure is directed to a portable navigation device with an ergonomic user interface.

2. Introduction

Today's GPS devices when used in a vehicular environment, are often distracting and/or difficult to use, because the controls are located either on or near the front display or off on the sides, making them difficult to locate. Further, many portable navigation devices (PND) are mounted on adjustable cradles and when the controls are touched, the housing and display moves. Thus, the user is distracted and disadvantageously is required to concentrate on keeping the device still, rather than making the appropriate key inputs when navigating. Thus, the keys are not optimally placed or placed where not visible or on a front face causing the display to share valuable front face real estate, thereby causing the display to be smaller. Additionally, there is a need to allow users to program keys, for improved user experience. In addition, there is a need for ergonomically configured PNDs with keys behind the display for several reasons. For example, PNDs need to allow users more control when pressing desired functions when navigating. More specifically, PNDs need to be secure when keys are pressed, versus pushing keys on the front and causing undesirable, mis-adjustment, movement and rotation. Also, PND keys need to be customizable, programmable and reversible, to enhance a user's experience with regard to the user interface. Stated differently, PNDs need to be easily customized from default settings. And, there is a need to strategically locate controls at locations other then the front panel, to minimize clutter on a front panel, where the display is located. Accordingly, there is a need to solve these problems and shortcomings. There is a need, to improve a user's experience in connection with PNDs, by for example using a squeezing gesture, when making control adjustments. Thus, a multi-touch gesture, such as squeezing between a user's thumb and fingers, allows the user to make desired adjustments, settings and customizations, while holding the PND securely, minimizing the chances of mis-aligning the display when mounted in a vehicle. Also, there is a need for intuitive and ergonomic PNDs. Thus, there is a need for improved PNDs.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
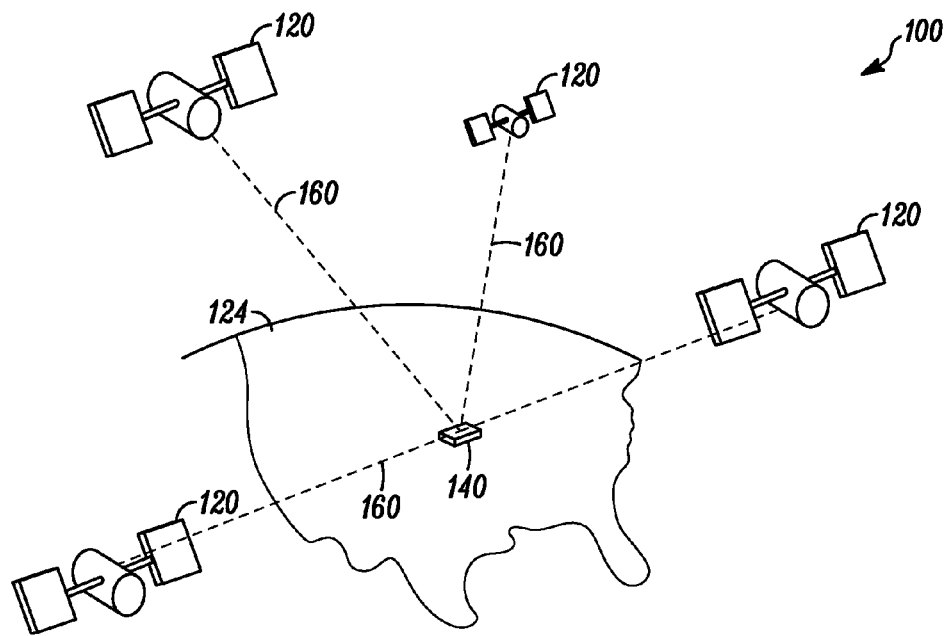
FIG. 1 is an exemplary block diagram of a global positioning system (GPS) shown with a portable navigation device in a vehicle.

FIG. 1 is an exemplary block diagram of a system 100 according to one embodiment. The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users. FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120. The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2:
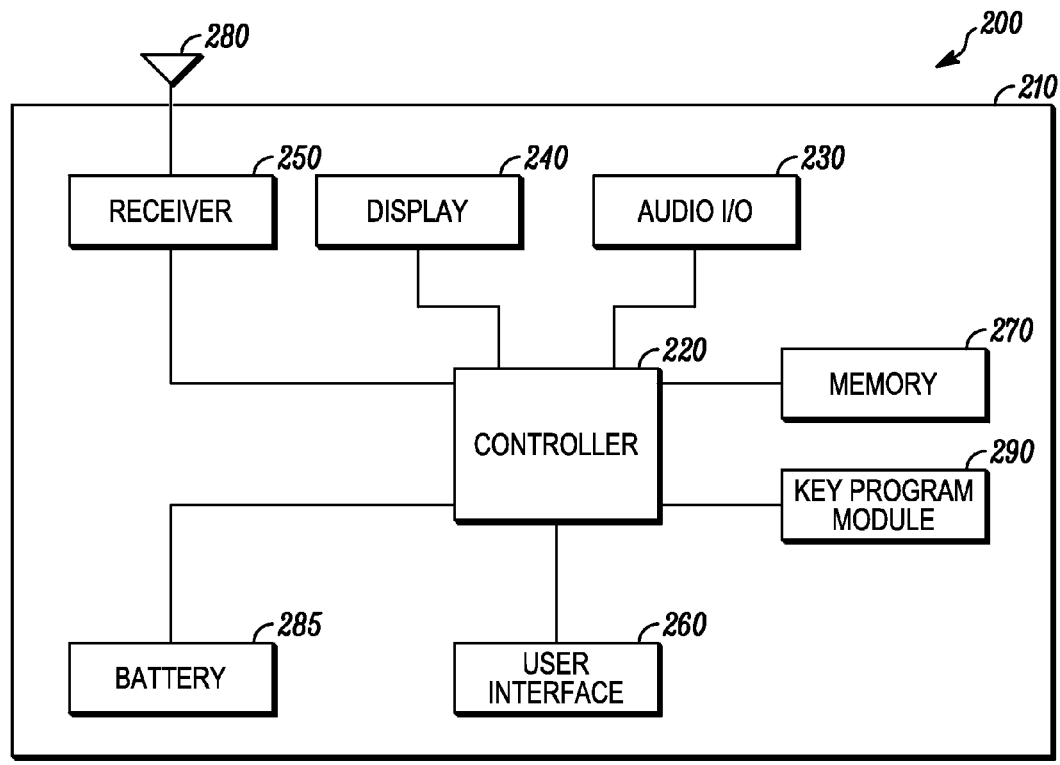
FIG. 2 is an exemplary block diagram of a portable navigation device with an ergonomic user interface according to one embodiment.

FIG. 2 is an exemplary block diagram of a ergonomic user interface for a portable navigation device (PND) 200, such as in 140 in FIG. 1, according to one embodiment. The PND 200 can include a housing 210, a controller 220 coupled to the housing 210, audio input and output circuitry 230 coupled to the housing 210, a display 240 coupled to the housing 210, a receiver 250 coupled to the housing 210, a user interface 260 coupled to the housing 210, a memory 270 coupled to the housing 210, an antenna 280 coupled to the housing 210 and the receiver 250, a removable energy storage device 285 coupled to the controller 220. The PND 200 can further include a key programming module 290, coupled to the controller 220. In more detail, the key programming module 290 can reside within the controller 220, can reside within the memory 270, can be an autonomous module, can be software, can be hardware, or can be in any other format useful for a module on the PND 200.

The display 240 can be a liquid crystal display (LCD), a light emitting diode (LED) display, a plasma display, or any other means for displaying information, and in a preferred embodiment it is a touch screen display for improved user interfacing. The receiver 250 is at least a GPS receiver. The PND 200 can also include a transceiver including transmitting and receiving capabilities, defining a mobile computing device integrated in the PND 200, as further detailed below. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

Figure 3:
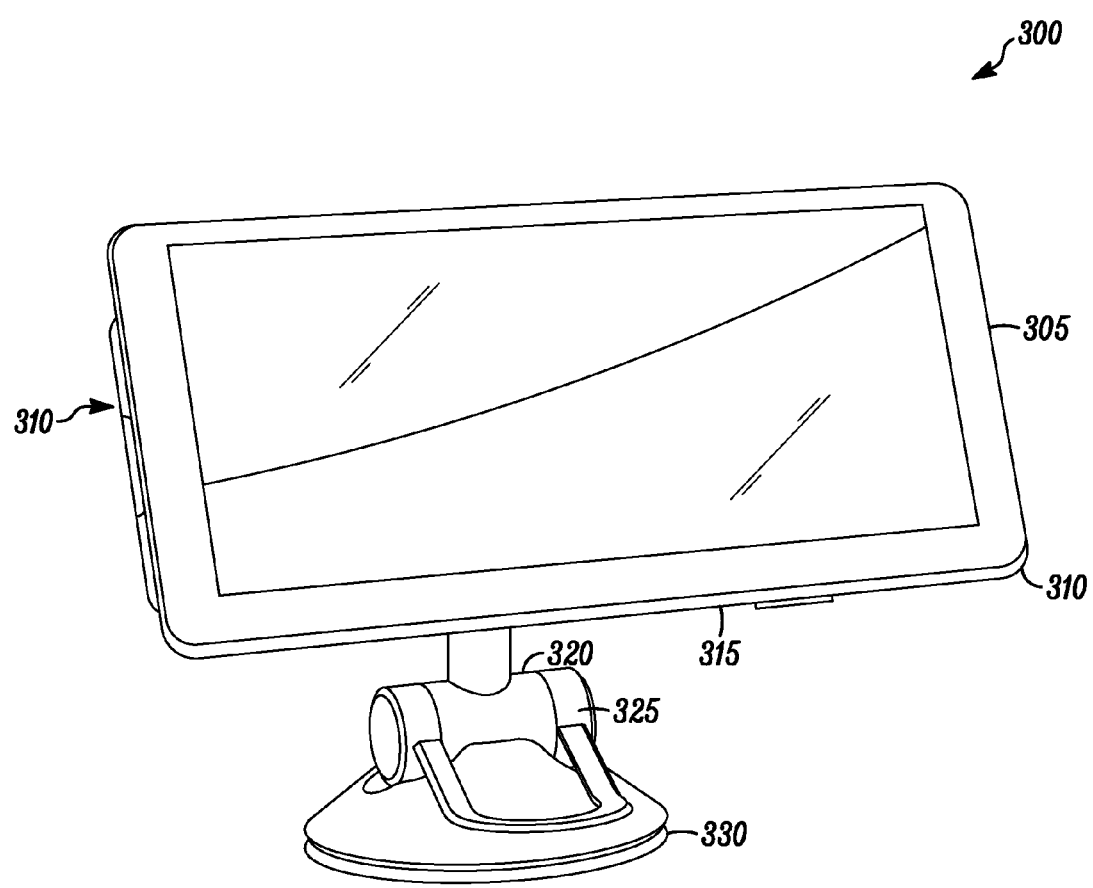
FIG. 3 is an exemplary front perspective view of a portable navigation device with an ergonomic user interface, shown with a cradle mount according to one embodiment.

In more detail, the PND 200 shown in FIGS. 2 and 3, includes: a housing 210; a controller 220 coupled to the housing 210, the controller 220 configured to control the operations of a portable navigation device; memory 270, coupled to the controller 220, being operable to store a route; an integrated global positioning system (GPS) receiver 250 in the housing 210, coupled to the controller 220; a display 240 within the housing 210 and coupled to the controller 220, the display 240 viewable from a front 305 of the housing 210; and a paddle control module 310 coupled to a rear portion 315 of the housing 210, configured to control certain operations of the device. Advantageously, the ergonomic design allows a user ease of access, to operate the PND accurately, intuitively and with minimal distraction, during operation.

In one embodiment, the PND 300 is connected to a cradle mount 320 for secure connection to a vehicle, for example. The cradle mount 320 includes a swivel mechanism 325 and a suction mechanism 330, for easy adjustment and secure connection to a vehicle, for example. In vehicular applications, the cradle mount 320 is connected to a dash board or wind shield. The cradle mount 320 can also provide power and/or a charge, through a conduit for example, to the PND 300.

Figure 4:
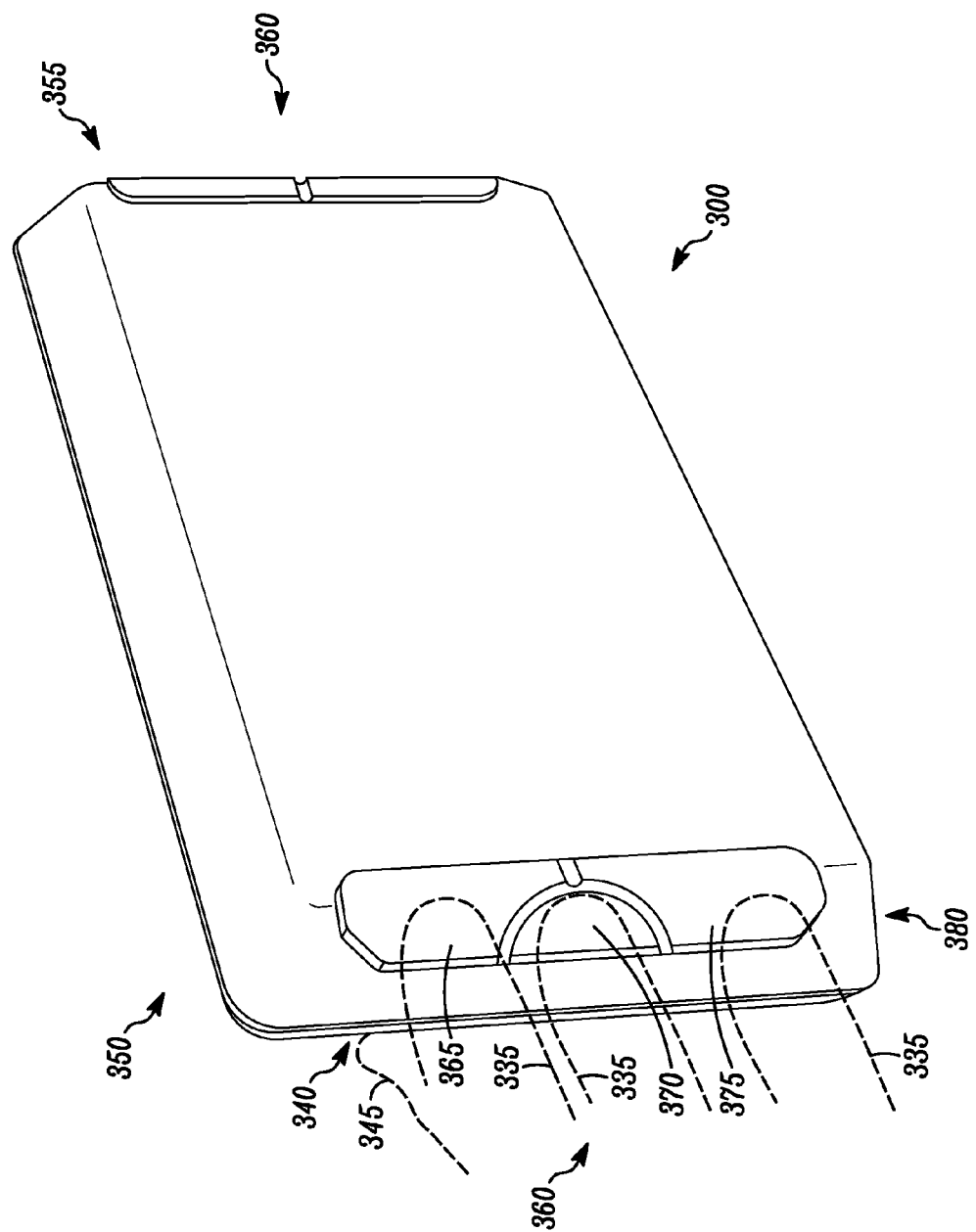
FIG. 4 is an exemplary rear perspective view of a portable navigation device with an ergonomic user interface shown with multiple keys adapted to receive a user's fingers according to one embodiment.
Figure 5:
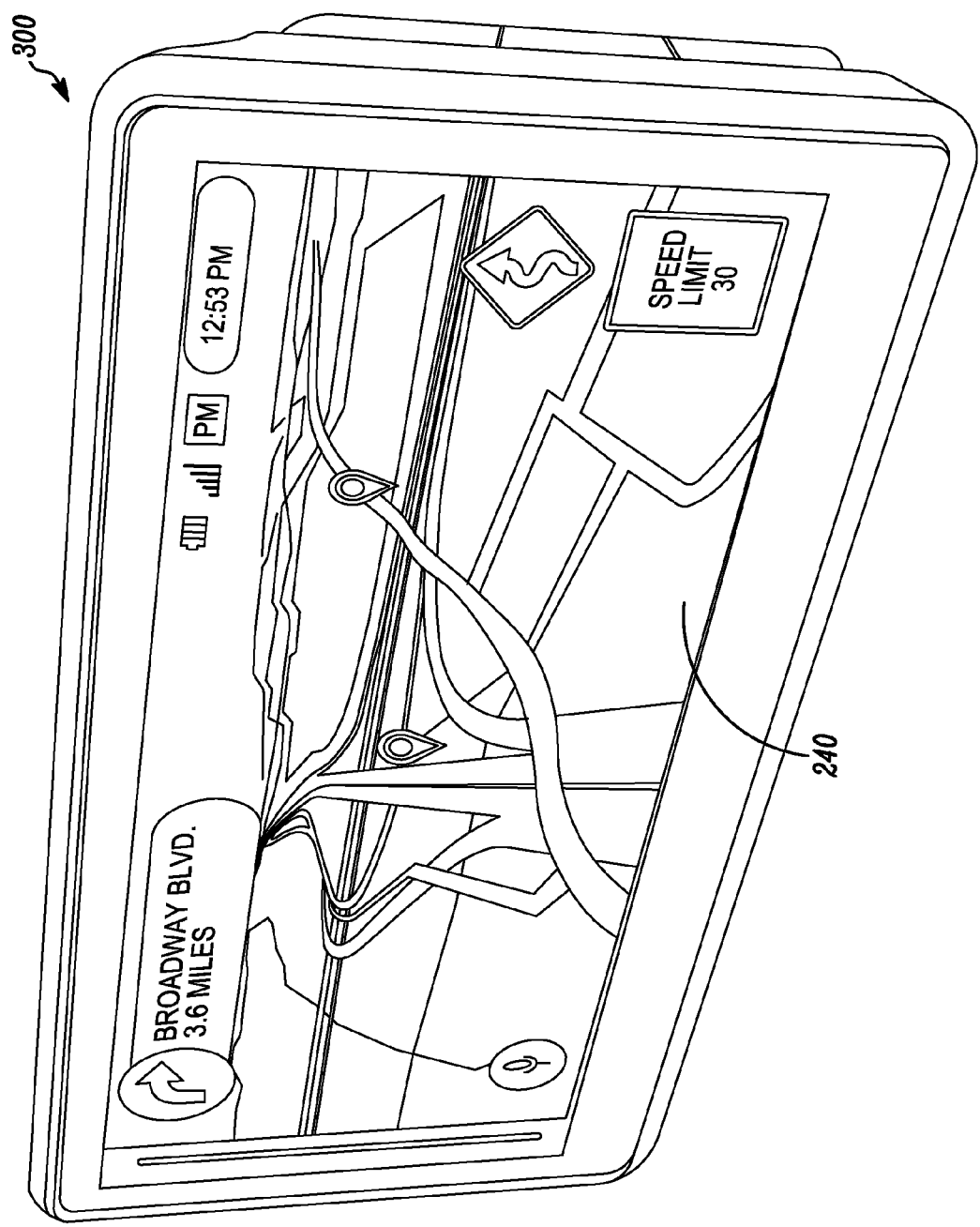
FIG. 5 is an exemplary frontal perspective view of a portable navigation device with an ergonomic user interface shown with a route displayed and default settings for keys on a paddle control module according to one embodiment.
Figure 6:
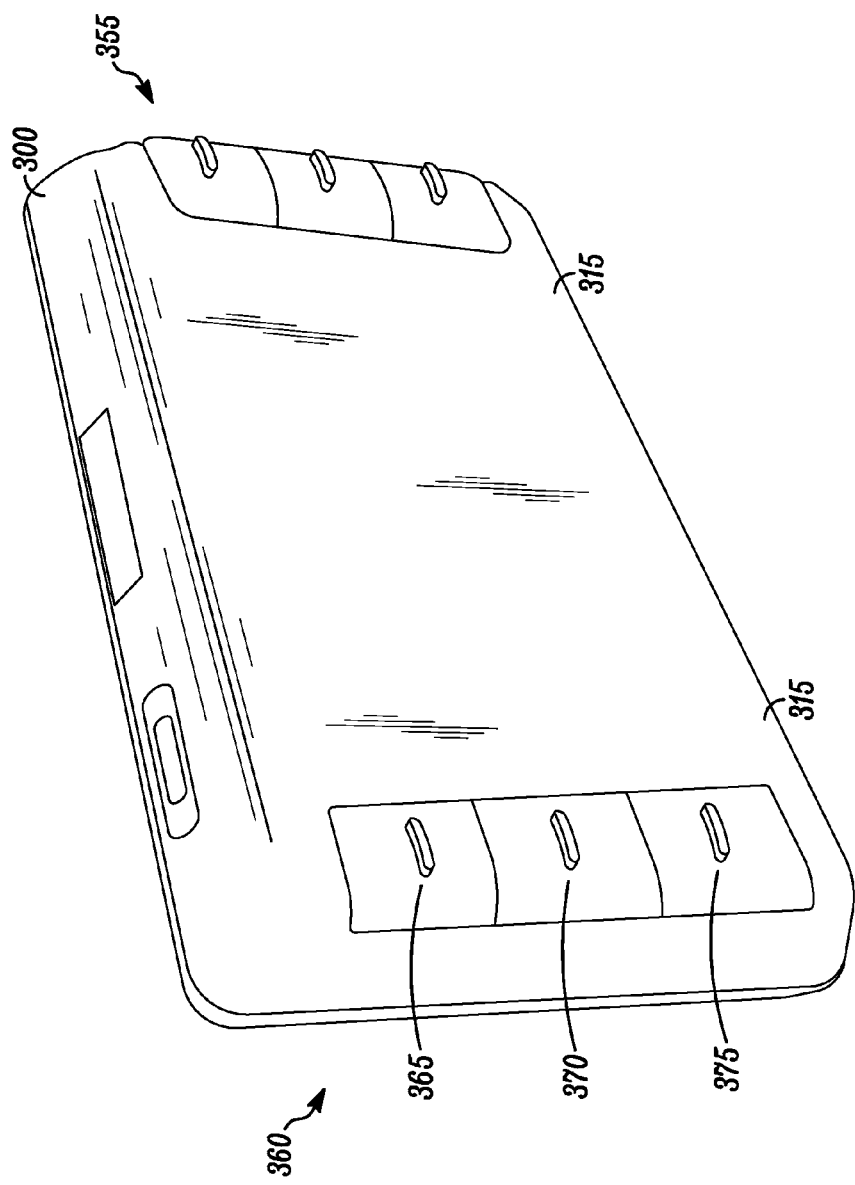
FIG. 6 is an exemplary rear perspective view of a portable navigation device with an ergonomic user interface with a route displayed and default settings for keys on a paddle control module according to one embodiment.

In one embodiment shown in FIG. 4, the paddle control module 310 is configured to receive a user's fingers and a front face or portion 305 of the housing 210 can include a ledge 340 adapted to receive a user's thumb 345, defining multi-touch surfaces for accurate key activation. Thus, during operation a multi-touch or squeezing action, allows a user to operate the PND 300, while minimizing the possibility of mis-adjustment of the display 240.

In more detail, the front portion 305 ledge 340, rear portion 315 opposite the front portion 305, where the paddle control module resides 310, cooperate to provide a narrow profile construction, which is configured to be held in the palm of a user's hand between the fingers and thumb (two or three touches), for a comfortable and accurate user interface.

Figure 7:
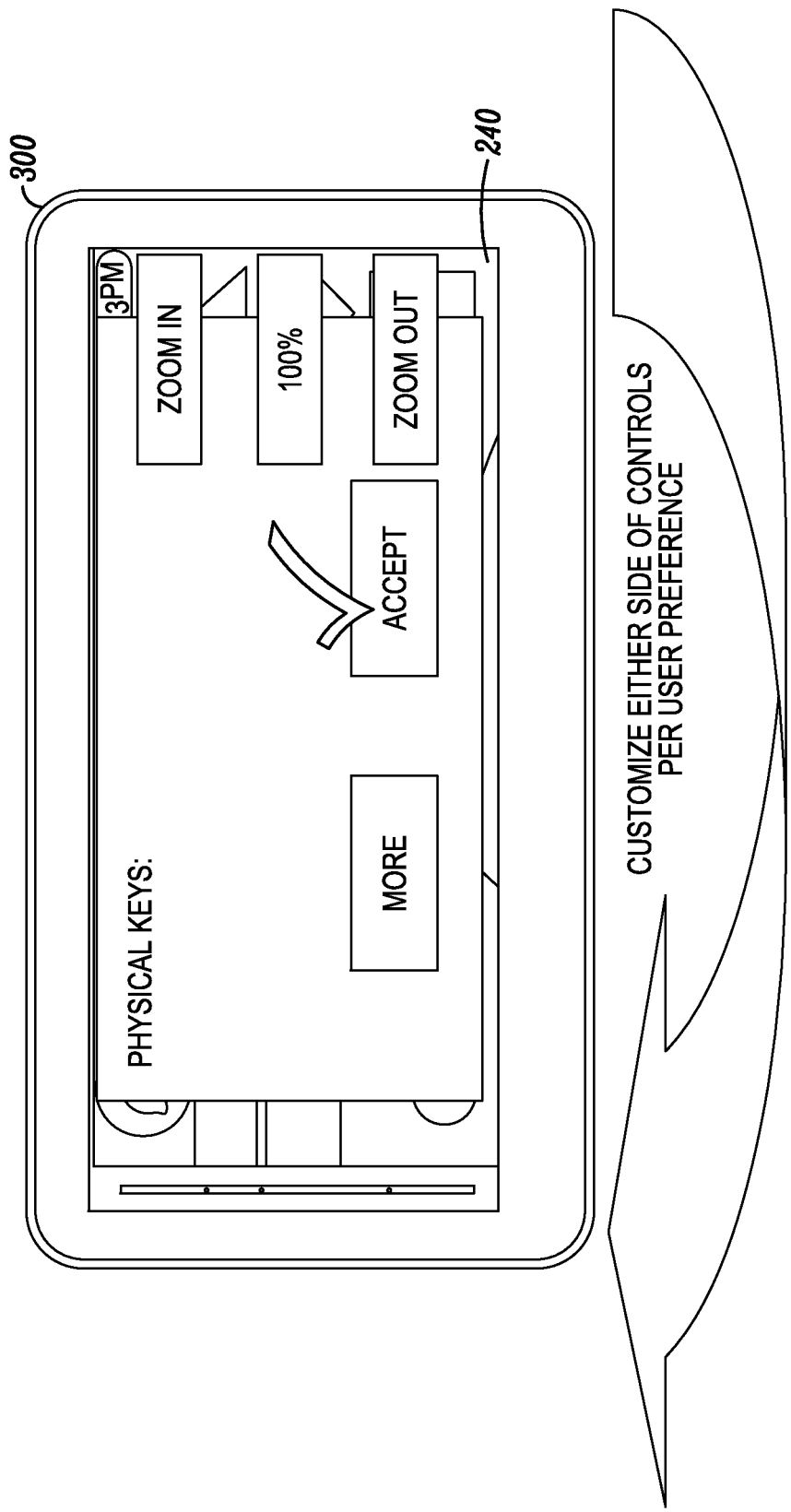
FIG. 7 is an exemplary frontal plan view of a portable navigation device with an ergonomic user interface with a display, showing how a user can customize the keys on a paddle control module according to one embodiment.

The controller 220, through the use of the key programming module 290, is configured to allow a user to program the operations of the paddle control module 310, as shown in FIG. 7, for example. To enhance the user experience, to suit his or her individual needs, a user can go into the software settings on the display, and pick from a number of functions, to assign to given paddle keys 360. For example, in one embodiment, a savvy or business-centric user, could program one side of the controls for voice recognition or telephony use. (For example, contacts could be associated with a top key, SMS on a bottom key and voice recognition on a middle key.) Through the settings in the software, there can be a list of functions that can be assigned to each key, to create a personalized product that suits a user's needs, versus conventional devices that do not fit a user's personal needs.

In one arrangement, the paddle control module 310 includes an east paddle control module 350 and a west paddle control module 355, each having multiple keys 360, such as a top key 365, a middle key 370 and a bottom key 375, as shown in FIG. 4. In a default setting, these keys are configured to adjust a speaker volume up, mute and speaker volume down, respectively.

Figure 8:
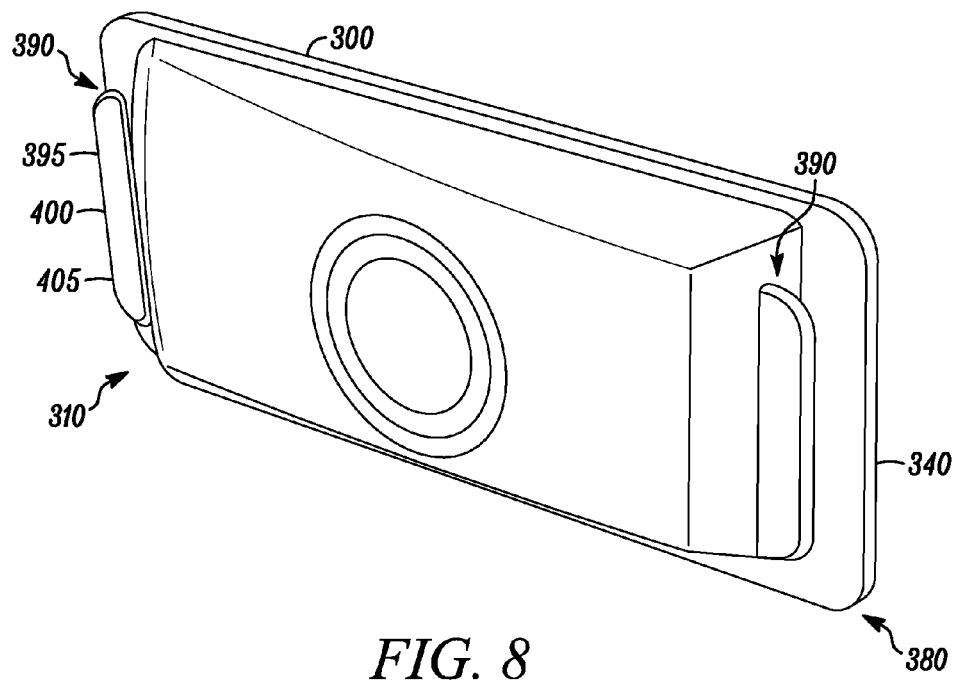
FIG. 8 is an exemplary rear perspective view of a portable navigation device with an ergonomic user interface shown with an elongated multi-toggle paddle control according to one embodiment.

Alternatively, as illustrated in FIG. 8, the paddle control module 310 can include an elongated multi-toggle control 390, such as a three way paddle shift control. In the embodiment in FIG. 8, a top portion 395, a middle portion 400 and a bottom portion 405, would act similar to that as detailed above, with respect to the top, middle and bottom keys 365, 370 and 375. This feature provides similar characteristics of paddle key arrangement being separated into three separate keys. The advantages can be as good as three separate keys. The multi-toggle control 390 can be a three way toggle switch and allows a user to anchor a thumb on a front portion 305, like a steering wheel, while his or her fingers wrap around the rear portion 315 to contact the multi-toggle control 390, in a squeezing like gesture, allowing a similar function, as separated paddle keys. Advantageously, the multi-toggle control 390 allows toggling without the feel of separated keys, and can toggle single key up and down to simulate similar functions as separated top and bottom keys. The multi-toggle control 390 provides an enhanced experience, but needs to be elongated for good functioning and feel.

As shown in the figures, the paddle control module 310 is substantially complementarily configured to fit at least partially in the housing 210 near a peripheral edge 380 of the housing 210, for ease of access.

Figure 9:
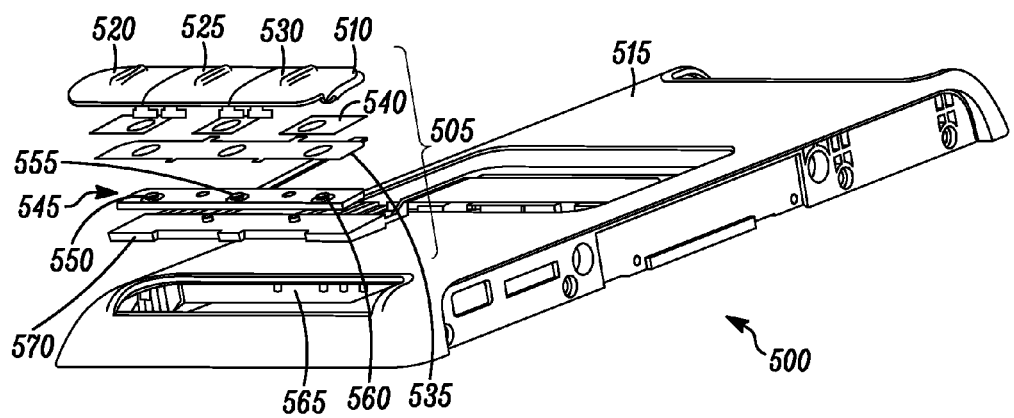
FIG. 9 is an exemplary partial perspective view of a portable navigation device with an ergonomic user interface with details of a paddle control module according to one embodiment.

As shown in FIG. 9, a PND 500 with an exemplary paddle control module 505 is shown. It can include: an external paddle key 510 being pivotably connected to the housing 515 having a top key portion 520, a middle key portion 525 and a bottom key portion 530; a carrier layer 535; an adhesive 540; a silicon substrate 545 including a plurality of popple dome switches 550, 555 and 560, connected to a printed circuit board 565 in the housing 515 and connected to the controller 220; and a stiffener substrate 570. Advantageously, this provides a narrow profile, portable and structurally robust PND 500.

Advantages of the paddle control module 500 and stack up construction, are generally to minimize size, be cost effective and provide a robust construction. Accordingly, the stack up allows for a robust and enhanced tactile feedback to the user, especially in a vehicular environment. The plastic key throw or pivot, is minimal. The popple dome switches 550, 555 and 560 provide definite feedback to a user through the hard keys 520, 525 and 530, versus soft touch keys that are used on resistive and capacitive type displays. These keys provide minimum real estate and allow the PND 200, 300 and 500, to be small and thin as possible.

In more detail, in one embodiment, the housing 210 includes at least one speaker, and preferably two speakers. This structure allows for audible directions, better quality audio, and an interface with an audio player, such as an Ipod, to listen to music in stereo.

In one arrangement, the housing 210 includes an energy storage device 285, such as a battery, a fuel cell, a fuel container and an electrochemical capacitor. Advantageously, this feature can allow a user to use, enter and interact with a PND anytime, as well is it can provide power for pedestrian travel or back up power in vehicular applications, for example.

In another embodiment, the PND 200 further includes a transceiver configured to be wirelessly coupled to a wireless communication device, such as a mobile phone.

In a preferred embodiment, the PND can be wirelessly coupled via near field communications, such as Bluetooth. Thus, when an incoming call comes to a wireless communication device, the incoming phone number can be displayed on the display. The PND 200 and features herein are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure. While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure. In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. An ergonomic user interface for a portable navigation device, comprising:
   a housing comprising a portable navigation device, the housing including a front face portion including east ledge and a west ledge to receive a user's thumb and a mounting mechanism configured to be mounted to a vehicle surface;
   a controller configured to control the operations of the portable navigation device;
   memory, coupled to the controller, being operable to store a route;
   an integrated global positioning system (GPS) receiver in the housing, the integral GPS coupled to the controller;
   a display located between the east ledge and the west ledge, the display carried on the housing and coupled to the controller, the display viewable from a front of the housing; and
   a paddle control module including an east elongated paddle control module located near a first peripheral edge of the housing, the east elongated paddle control module having a plurality of keys adapted to receive a user's fingers, the east elongated paddle control module residing on a rear portion of the housing opposite the east ledge, to define a multi-touch squeeze activation, wherein each key of the plurality of keys includes a respective first key edge that is located near the first peripheral edge of the housing and a second key edge opposite to the first key edge that is pivotably connected to the housing at a location of the rear portion of the housing, the location being between the first peripheral edge and a second peripheral edge, wherein the second peripheral edge is opposite to the first peripheral edge;
   a substrate including a plurality of switches connected to a printed circuit board in the housing and connected to the controller; and
   a carrier layer, positioned between the plurality of keys and the plurality of switches, the carrier layer activating at least one of the plurality of switches based on at least one of the plurality of keys pivoting in response to the multi-touch squeeze activation.

2. The device of claim 1 wherein the controller is configured to allow a user to program the operations of the east elongated paddle control module.

3. The device of claim 1 wherein the east elongated paddle control module is configured to fit at least partially in the housing near an edge of the housing.

4. The device of claim 1 wherein the housing includes at least one speaker.

5. The device of claim 1 wherein the housing includes an energy storage device.

6. The device of claim 1 wherein the housing includes a narrow profile edge configured to be held in a user's palm between the fingers and thumb, defining an ergonomic user interface.

7. The device of claim 1 wherein a transceiver is configured to be wirelessly coupled to a wireless communication device.

8. The device of claim 1 wherein the housing includes a transceiver configured to be wirelessly coupled to a wireless communication device via near field communications.

9. The device of claim 1 wherein the display is a touch screen.

10. An ergonomic control for a portable navigation device, comprising:
   a housing comprising a portable navigation device, the housing including a front face portion including east ledge and a west ledge to receive a user's thumb and a mounting mechanism configured to be mounted to a vehicle surface;

a controller configured to control the operations of the portable navigation device and allow a user to program the operations of the paddle control module;

memory, coupled to the controller, being operable to store a route;

an integrated global positioning system (GPS) receiver in the housing, the integral GPS coupled to the controller;

a touch screen display located between the east ledge and the west ledge, the touch screen display carried on the housing and coupled to the controller, the display viewable from a front of the housing; and a paddle control module including an east elongated paddle control module located near a first peripheral edge of the housing, the east elongated paddle control module having bottom key plurality of keys adapted to receive a user's fingers, the east elongated paddle control module residing on a rear portion of the housing opposite the east ledge, defining multi-touch surfaces for accurate key activation, wherein each key of the plurality of keys includes a respective first key edge that is located near the first peripheral edge of the housing and a second key edge opposite to the first key edge that is pivotably connected to the housing at a location of the rear portion of the housing, the location being between the first peripheral edge and a second peripheral edge, wherein the second peripheral edge is opposite to the first peripheral edge;

a substrate including a plurality of switches connected to a printed circuit board in the housing and connected to the controller; and a carrier layer, positioned between the plurality of keys and the plurality of switches, the carrier layer activating at least one of the plurality of switches based on at least one of the plurality of keys pivoting in response to a multi-touch squeeze activation.

11. The device of claim 10 wherein the transceiver is configured to be wirelessly coupled to a wireless communication device.

12. The device of claim 10 wherein the housing includes a transceiver configured to be wirelessly coupled to a wireless communication device via near field communications.

13. An ergonomic control for a portable navigation device, comprising:

a housing comprising a portable navigation device, the housing including a front face portion including east ledge and a west ledge to receive a user's thumb and a mounting mechanism configured to be mounted to a vehicle surface;

a controller configured to control the operations of the portable navigation device and allow a user to program the operations of the paddle control module;

memory, coupled to the controller, being operable to store a route;

an integrated global positioning system (GPS) receiver in the housing, the integral GPS coupled to the controller;

a touch screen display located between the east ledge and the west ledge, the touch screen display carried on the housing and coupled to the controller, the display viewable from a front of the housing; and a paddle control module including an east elongated paddle control module located near a first peripheral edge of the housing, the east elongated paddle control module having a plurality of keys adapted to receive a user's fingers, the east elongated paddle control module residing on a rear portion of the housing opposite the east ledge, defining multi-touch surfaces for accurate key inputting, wherein each key of the plurality of keys includes a respective first key edge that is located near the first peripheral edge of the housing and a second key edge opposite to the first key edge that is pivotably connected to the housing at a location of the rear portion of the housing, the location being between the first peripheral edge and a second peripheral edge, wherein the second peripheral edge is opposite to the first peripheral edge;

a substrate including a plurality of switches connected to a printed circuit board in the housing and connected to the controller; and a carrier layer, positioned between the plurality of keys and the plurality of switches, the carrier layer activating at least one of the plurality of switches based on at least one of the plurality of keys pivoting in response to a multi-squeeze activation.

* * * * *